Figures 1, 2, 3:
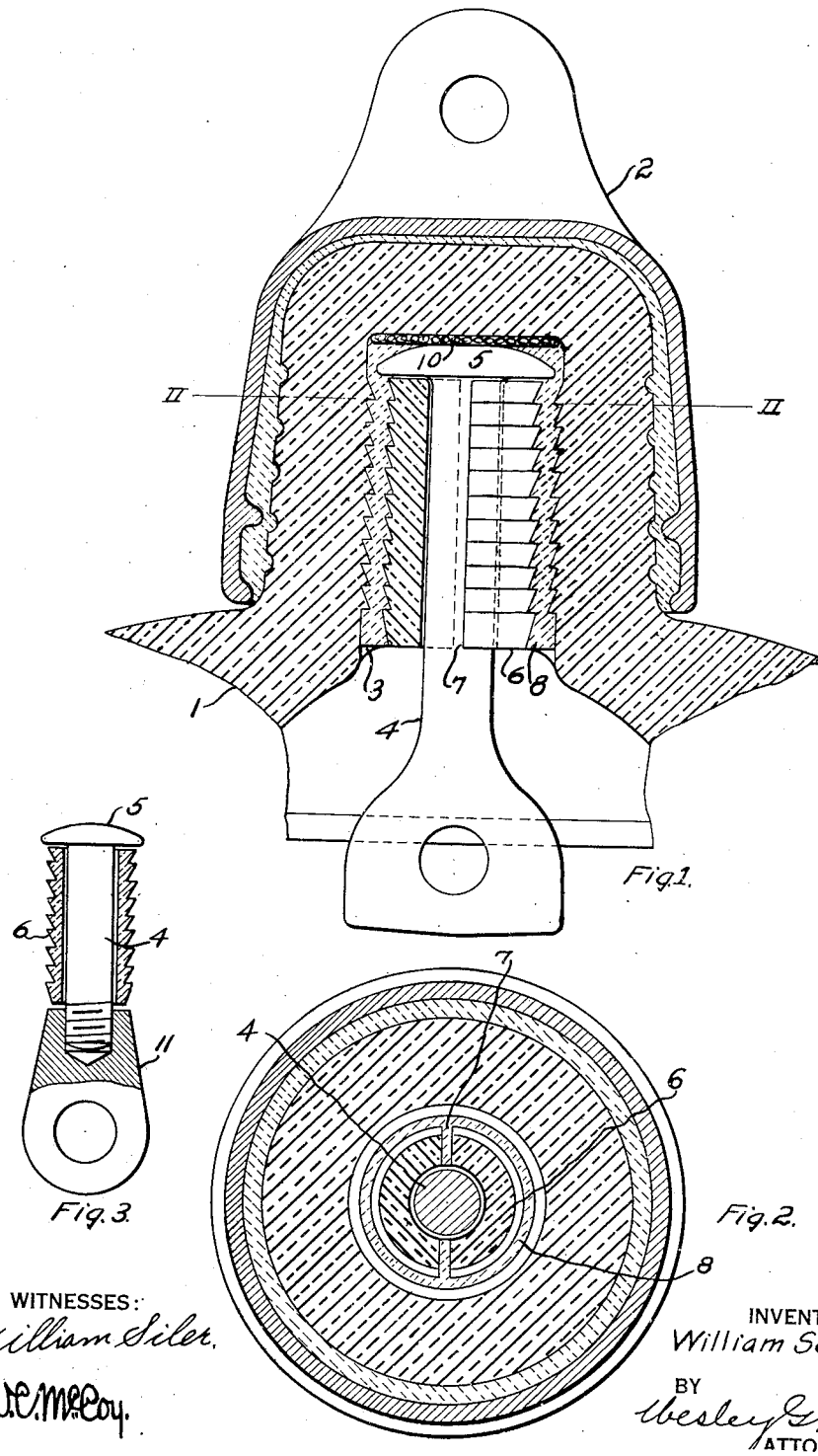

W. SCHAAKE.
INSULATOR.
APPLICATION FILED APR. 5, 1917.

1,363,673.

Patented Dec. 28, 1920.

WITNESSES:
William Siler.
W.C.McCoy.

INVENTOR
William Schaake.
BY
Wesley G. Carr
ATTORNEY

UNITED STATES PATENT OFFICE.

WILLIAM SCHAAKE, OF PITTSBURGH, PENNSYLVANIA, ASSIGNOR TO WESTING-HOUSE ELECTRIC & MANUFACTURING COMPANY, A CORPORATION OF PENN-SYLVANIA.

INSULATOR.

1,363,673.

Specification of Letters Patent.  Patented Dec. 28, 1920.

Application filed April 5, 1917.  Serial No. 159,955.

*To all whom it may concern:*

Be it known that I, WILLIAM SCHAAKE, a citizen of the United States, and a resident of Pittsburgh, in the county of Allegheny and State of Pennsylvania, have invented a new and useful Improvement in Insulators, of which the following is a specification.

My invention relates to electrical insulators and particularly to insulators that are adapted to support conductors for carrying high-voltage currents.

The object of my invention is to provide an improved insulator of the above-designated type that shall embody a minimum amount of metal and cementing material.

Heretofore, it has been found that the expansion and contraction of a large body of embedded metal tends to impose severe strains upon the insulating body in which such metal is embedded and eventually causes a break-down of such insulating body. Furthermore, the cementing material, which is usually employed for embedding the metal hangers of such insulators, is hydroscopic and tends to absorb moisture from the atmosphere, which, during cold weather, freezes and materially weakens the insulating structure.

An insulator constructed in accordance with my invention avoids the evils hereinbefore set forth by surrounding the suspension pin with a bushing of vitreous material and securing the pin and bushing in a recess in the insulator by means of a thin layer of cementing material.

Figure 1 of the accompanying drawing is a central sectional view, partially in side elevation, of an insulator constructed in accordance with my invention; Fig. 2 is a view taken on the line II—II of Fig. 1; and Fig. 3 is a view similar to Fig. 1 but showing a portion only of a modified structure.

The device shown in Figs. 1 and 2 of the drawing comprises an insulator 1 having a cap 2 that is secured thereto and is adapted to suspend the insulator, and a recess 3 that is provided with an improved form of suspension pin 4. The pin 4 is of just sufficient cross-section to withstand the mechanical strains imposed upon it and is provided with a head 5 that is positioned within the recess 3 of the insulator and abuts against a bushing 6 of porcelain or other vitreous material. The bushing 6 is of just sufficient size to be admitted into the recess 3 when disposed around the shank of the pin 4 and is preferably split into complementary portions for ease in assembling. A small aperture 7 is left between the contiguous portions of the bushing to admit cement 8, or other material, that is used for securing the pin 4 and the bushing 6 in place. The outer surface of the bushing 6 is serrated, as is also the surface of the recess 3, in order that the layer of cement may be very thin and yet embody sufficient material to withstand the stress imposed upon the supporting pin 4. A small pad 10 of felt, or other resilient material, may be positioned at the bottom of the recess 3 in order to take up strains produced by the expansion and contraction of the head of the pin 4.

Fig. 3 illustrates a modification of my device in which a single-piece bushing 6 is used and the pin 4 comprises two separable parts. The nut 11 is secured to a threaded portion of the pin 4 and constitutes a suspension means for supporting cables or other insulators.

The insulator is assembled by placing the pin 4 and the bushing 6 within the recess 3 and pouring cementing material 8 into the opening between the porcelain bushing and the insulator 1. The bushing 6 is preferably composed of material that is substantially more durable than cement and more able to withstand the strain upon the head 5 without rupture.

Although I have described my invention in a simple and preferred form, I desire it shall be limited only in accordance with the spirit and scope of the appended claims.

I claim as my invention:

1. A suspension insulator comprising an insulating member provided with a recess of substantially uniform cross sectional area throughout its length, a pin having a head of substantially the same cross sectional area as the recess, and a sleeve cemented in said recess for holding said pin.

2. A suspension insulator comprising an insulating member provided with a recess of substantially uniform cross sectional area throughout its length, a pin having a head at one end of substantially the same cross sectional area as the recess and an enlargement at the other end, and a sectional sleeve cemented in said recess for holding said pin.

3. A suspension insulator comprising an insulating member having a recess of substantially uniform cross sectional area from end to end, a sleeve having a transverse shoulder cemented in position in the recess, a pin disposed in the sleeve and provided with means extending substantially over the entire area of said shoulder and of the recess for transmitting the pulling forces of the pin to said sleeve.

4. A suspension insulator comprising an insulating member having a recess of substantially uniform cross sectional area from end to end, a sleeve of insulating material having a transverse shoulder cemented in position in the recess, a pin disposed in the sleeve and provided with means extending substantially over the entire area of said shoulder and of the recess for transmitting the pulling forces of the pin to said sleeve.

5. A suspension insulator comprising an insulating member having a recess of substantially uniform cross sectional area from end to end, a sleeve having a transverse shoulder cemented in position in the recess by a relatively thin body of cement, a pin disposed in the sleeve and provided with means extending substantially over the entire area of said shoulder and of the recess for transmitting the pulling forces of the pin to said sleeve.

6. An insulator for sustaining its main load in the direction of its longitudinal axis, comprising an insulating member having a recess of substantially uniform cross sectional area throughout its length, a sleeve having a transverse shoulder cemented in position in the recess, a pin disposed in the sleeve and provided with means extending substantially over the entire area of said shoulder and of said recess for transmitting the longitudinal main-load forces of the pin to said shoulder.

7. An insulator comprising an insulating member provided with a recess having substantially uniform cross sectional area from end to end, a bushing having its outer surface relatively close to the surface of said recess and cemented thereto and a pin having a head of substantially the same cross sectional area as the bushing and held in said recess by said bushing.

8. A suspension insulator comprising an insulating member provided with a recess having substantially uniform cross sectional area from end to end, a pin disposed in said recess and having a head of substantially the same cross sectional area as said recess, a bushing embracing the pin and having its outer surface relatively close to the surface of said recess, and a relatively thin body of cement disposed between said bushing and said insulating member.

9. A suspension insulator comprising an insulating member provided with a recess having substantially uniform cross sectional area from end to end, a pin disposed in said recess and having a head of substantially the same cross sectional area as said recess, a bushing of substantially the same coefficient of expansion as the insulating member and embracing the pin and having its outer surface relatively close to the surface of the recess, and a relatively thin body of cement disposed in said recess and engaging said bushing and said insulating member.

10. A suspension insulator comprising an insulating member provided with a recess having substantially uniform cross sectional area from end to end, a pin disposed in said recess and having a head of substantially the same cross sectional area as said recess, a bushing embracing the pin and having its outer surface relatively close to the surface of the recess, and a relatively thin body of cement disposed between said bushing and said insulating member and substantially filling the remaining otherwise unoccupied portion of said recess.

11. A suspension insulator comprising an insulating member provided with a recess having substantially uniform cross sectional area from end to end, a pin disposed in said recess and having a head of substantially the same cross sectional area as said recess and having its bearing surface substantially at right angles to the axis of said pin, and a bushing embracing said pin and having a bearing surface substantially at right angles to the axis of the pin having its outer surface relatively close to the surface of said recess and cemented thereto.

12. In a suspension insulator, the combination with an insulating member having a recess, of a tension terminal device cemented in position in the recess and comprising a pin having a transverse projection and a sleeve surrounding the pin and having a transverse seat for the projection, the external diameter and length of the sleeve being nearly equal to the corresponding dimensions of the recess to provide a relatively great effective cement-holding area for the terminal device, and the lateral dimensions of the pin projection and sleeve being no greater than the narrowest portion of the recess, whereby free withdrawal of the terminal device may be effected without injury to the insulating member in case the cement becomes ruptured or detached.

In testimony whereof, I have hereunto subscribed my name this 26th day of March, 1917.

WILLIAM SCHAAKE.